(12) United States Patent
Takeda et al.

(10) Patent No.: US 11,071,068 B2
(45) Date of Patent: Jul. 20, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/333,078

(22) PCT Filed: Sep. 13, 2017

(86) PCT No.: PCT/JP2017/033023
§ 371 (c)(1),
(2) Date: Mar. 13, 2019

(87) PCT Pub. No.: WO2018/052018
PCT Pub. Date: Mar. 22, 2018

(65) Prior Publication Data
US 2019/0268861 A1    Aug. 29, 2019

(30) Foreign Application Priority Data

Sep. 14, 2016  (JP) .............................. JP2016-179896

(51) Int. Cl.
*H04W 52/36*    (2009.01)
*H04L 5/00*    (2006.01)
(Continued)

(52) U.S. Cl.
CPC ......... *H04W 52/365* (2013.01); *H04L 5/0082* (2013.01); *H04W 24/10* (2013.01);
(Continued)

(58) Field of Classification Search
CPC ............... H04W 52/365; H04W 80/02; H04W 72/0446; H04W 24/10; H04W 72/042; H04W 72/0473; H04L 5/0082
See application file for complete search history.

(56) References Cited

U.S. PATENT DOCUMENTS 8,958,342 B2 *  2/2015  Dinan ................. H04L 61/6022
                                              370/254
10,375,680 B2 *  8/2019  Han ..................... H04W 52/367
(Continued)

FOREIGN PATENT DOCUMENTS

CN      105407524 A    3/2016
EP      3361791 A1     8/2018
(Continued)

OTHER PUBLICATIONS

Extended European Search Report issued in European Application No. 17850919.6, dated Jul. 1, 2019(9 pages).
(Continued)

*Primary Examiner* — Mehmood B. Khan
(74) *Attorney, Agent, or Firm* — Osha Bergman Watanabe & Burton LLP

(57) ABSTRACT

The present invention is designed so that proper power headroom reports (PHRs) can be transmitted as feedback even when shortened processing time and/or shortened transmission time intervals (TTIs) are used. According to one aspect of the present invention, a user terminal has a transmission section that transmits an uplink signal in a shortened transmission time interval (sTTI) in a given carrier, and a control section that controls generation and transmission of a power headroom report (PHR) based on a power headroom (PH) of one or more sTTIs.

5 Claims, 10 Drawing Sheets

(51) Int. Cl.
*H04W 72/04* (2009.01)
*H04W 80/02* (2009.01)
*H04W 24/10* (2009.01)

(52) U.S. Cl.
CPC ..... *H04W 72/042* (2013.01); *H04W 72/0446* (2013.01); *H04W 72/0473* (2013.01); *H04W 80/02* (2013.01)

(56) References Cited

U.S. PATENT DOCUMENTS

| | | | |
|---|---|---|---|
| 2014/0056278 A1* | 2/2014 | Marinier | H04W 72/1268 370/330 |
| 2015/0319716 A1* | 11/2015 | Park | H04W 16/32 370/329 |
| 2016/0044600 A1* | 2/2016 | Kim | H04W 52/325 455/127.1 |
| 2016/0183203 A1* | 6/2016 | Larsson | H04W 52/386 370/329 |
| 2016/0192376 A1* | 6/2016 | Lee | H04W 72/0406 370/252 |
| 2016/0205632 A1* | 7/2016 | Yi | H05K 999/99 455/522 |
| 2016/0255594 A1 | 9/2016 | Vajapeyam et al. | |
| 2016/0262101 A1* | 9/2016 | Nammi | H04L 1/16 |
| 2016/0330011 A1* | 11/2016 | Lee | H04L 5/006 |
| 2017/0332386 A1* | 11/2017 | Li | H04W 72/1284 |
| 2018/0014256 A1* | 1/2018 | Yi | H04W 52/367 |
| 2018/0249428 A1 | 8/2018 | Huang et al. | |
| 2018/0324839 A1* | 11/2018 | Feng | H04W 72/1284 |
| 2019/0110311 A1* | 4/2019 | Falconetti | H04W 72/0453 |
| 2019/0116611 A1* | 4/2019 | Lee | H04W 72/1278 |
| 2019/0215781 A1* | 7/2019 | Jeon | H04W 76/32 |
| 2019/0239171 A1* | 8/2019 | Ahn | H04W 72/0446 |

FOREIGN PATENT DOCUMENTS

| | | |
|---|---|---|
| WO | 2015/139795 A1 | 9/2015 |
| WO | 2016137816 A2 | 9/2016 |

OTHER PUBLICATIONS

International Search Report issued in PCT/JP2017/033023 dated Nov. 14, 2017 (1 Page).
Written Opinion of International Searching Authority issued in PCT/JP2017/033023 dated Nov. 14, 2017 (3 Pages).
NTT Docomo, Inc.; "Condition to include Type2 PH"; 3GPP TSG-RAN WG2 #91 bis, R2-154408; Malmö, Sweden, Oct. 5-9, 2015 (8 Pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)" Dec. 2014 (251 Pages).
Office Action issued in the counterpart European Patent Application No. 17850919.6, dated Feb. 3, 2020 (5 pages).
Office Action in counterpart European Patent Application No. 17 850 919.6 dated Nov. 13, 2020 (4 pages).
3GPP TSG RAN WG1 Meeting #85; R1-164867 "CQI feedback overhead reduction in short TTI" Huawei HiSilicon; Nanjing, China; May 23-27, 2016 (6 pages).
Office Action issued in European Application No. 17850919.6; dated Jun. 23, 2020 (5 pages).

* cited by examiner

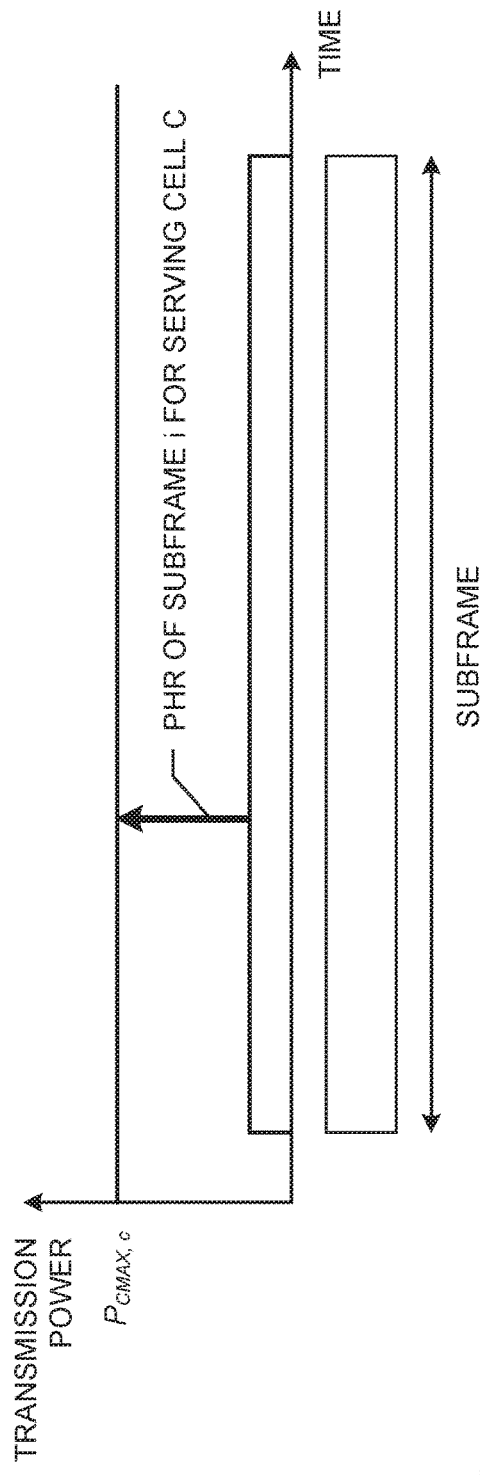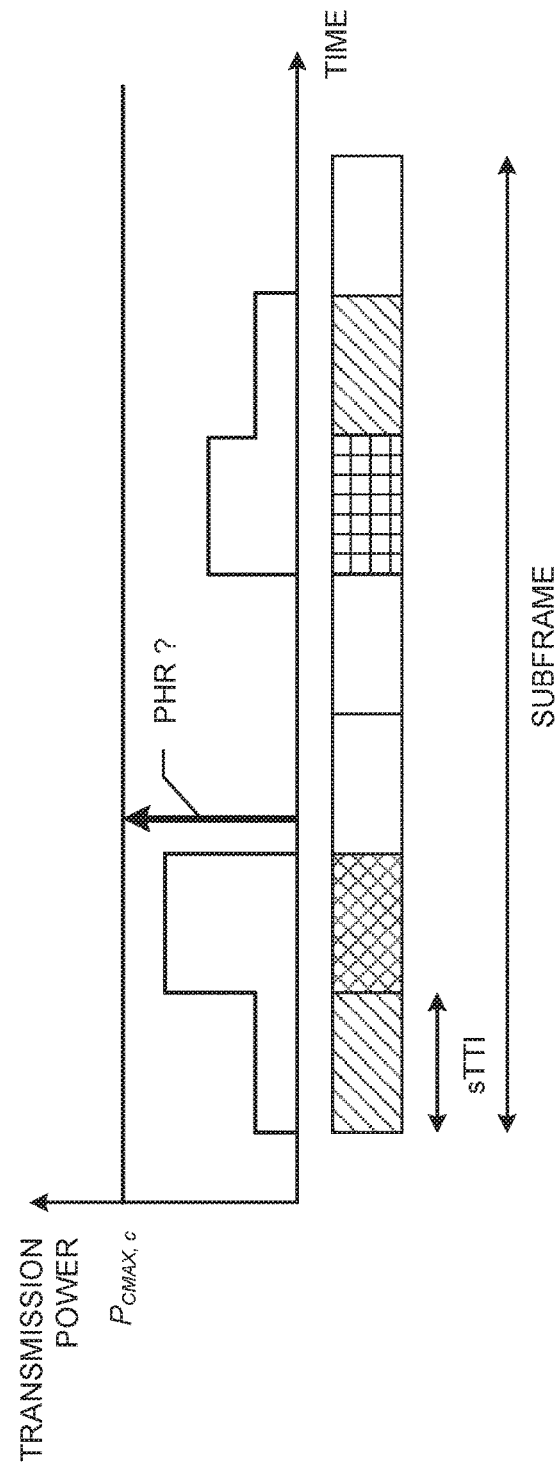

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CCs) is introduced in order to achieve broadbandization. Each CC is configured with the system bandwidth of LTE Rel. 8 as one unit. Furthermore, in CA, a plurality of CCs of the same radio base station (referred to as an "eNB (evolved Node B)," a "BS (Base Station)" and so on) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and take place in the same frequency band, are introduced.

Also, in existing LTE, UE transmits, as feedback, a power headroom report (PHR), which contains information about each serving cell's uplink power headroom (PH), to a device on the network side (for example, an eNB). The eNB can control the UE's uplink transmission power, dynamically, based on PHRs.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, 5G is under research to provide radio communication services referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, depending on the communicating device, M2M may be referred to as "D2D (Device To Device)," "V2V (Vehicle To Vehicle)," and/or the like.

For LTE Rel. 14, research is underway on introducing latency reduction technology as one technique to fulfill the above-mentioned requirements for various types of communication. To be more specific, studies are in progress to shorten the processing time by maintaining the length of a transmission time interval (TTI), which serves as the minimum time unit of scheduling, at 1 ms, as in existing LTE systems (LTE Rel. 8 to 12), and applying shorter processing time than in existing LTE systems (shortened processing time). Furthermore, there are on-going studies to communicate by using, with shortened processing time, TTIs (which may be, for example, referred to as "shortened TTIs (sTTIs)") that are shorter than 1 ms.

However, if an existing PHR reporting method is used when shortened processing time and/or shortened TTIs are used, problems might arise, such as that an eNB cannot know UE's uplink transmission power accurately, and applies unsuitable transmission power control to the UE. In this case, the quality of communication, communication throughput, spectral efficiency and so forth might decline.

The present invention has been made in view of the above, and it is therefore an object of the present invention to provide a user terminal and a radio communication method, whereby proper PHRs can be transmitted as feedback even when shortened processing time and/or shortened TTIs are used.

Solution to Problem

According to one aspect of the present invention, a user terminal has a transmission section that transmits uplink signals in a shortened transmission time interval (sTTI) in a given carrier, and a control section that controls the generation and transmission of power headroom reports (PHR (Power Headroom Report)) based on power headroom (PH (Power Headroom)) of one or more sTTIs.

Advantageous Effects of Invention

According to the present invention, proper PHRs can be transmitted as feedback even when shortened processing time and/or shortened TTIs are used.

BRIEF DESCRIPTION OF DRAWINGS

FIGS. 1A and 1B are diagrams to explain problems that might arise when an existing method of PHR calculation is applied to sTTIs;

DESCRIPTION OF EMBODIMENTS

Figure 2:
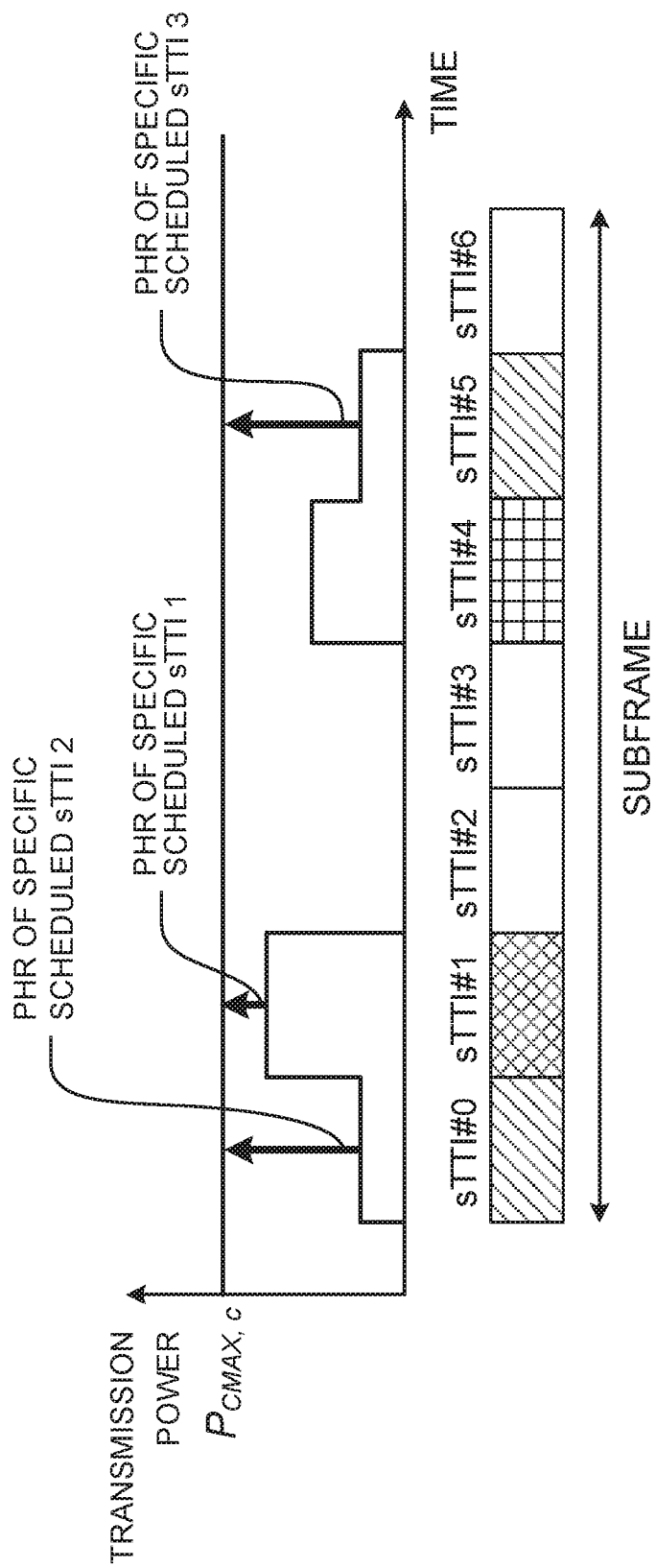
FIG. 2 is a diagram to show examples of PHRs according to embodiment 1.1 of the present invention.

In 5G/NR, studies are in progress to shorten the processing time it takes to transmit and receive signals compared to existing LTE systems. As for the method of enabling reduction of processing time, communication may be controlled on a per subframe basis as in existing LTE systems, and, apart from this, it may be possible to configure the processing time shorter than the processing time in existing LTE systems.

Here, the processing time in existing LTE systems (for example, the processing time in LTE Rel. 8 to 12) may be referred to as "normal processing time." Processing time shorter than the normal processing time may be referred to as "shortened processing time." Shortened processing time may be configured for specific processes (may be configured in various units, such as per signal, per process, etc.), or configured for all processes.

Note that shortened processing time may be defined in the specification in advance, or reported to (configured in, indicated to, etc.) UE by using higher layer signaling (for example, radio resource control (RRC) signaling, broadcast information (including, for example, the master information block (MIB), system information blocks (SIBs), etc.), medium access control (MAC) signaling and so forth), physical layer signaling (for example, downlink control information (DCI)) and/or other signals, or by combining these.

UEs where shortened processing time is configured may use existing data and control channels (for example, a downlink control channel (PDCCH (Physical Downlink Control CHannel)), a downlink data channel (PDSCH (Physical Downlink Shared CHannel)), an uplink control channel (PUCCH (Physical Uplink Control CHannel)), an uplink data channel (PDSCH (Physical Uplink Shared CHannel)) and so on).

UEs where shortened processing time is configured may control the signal transmitting/receiving processes (for example, encoding) for predetermined signals, so that these signals are transmitted/received at earlier timings than the transmitting/receiving timings defined in existing LTE systems. In this case, for example, the following times in existing LTE systems are likely to become shorter than a certain length of time (for example, 4 ms):

(1) the time it takes, after DL data is received, until an HARQ-ACK is transmitted in response, and/or the time it takes, after an HARQ-ACK is transmitted, until DL data is received in response; and (2) the time it takes, after a UL grant is received, until UL data is transmitted in response, and/or the time it takes, after UL data is transmitted, until a UL grant is received in response.

Also, as for the method of enabling latency reduction in communication, it may be possible to control transmission and/or receipt of signals by introducing shortened TTIs, which are shorter in duration than subframes (1 ms) in existing LTE systems. Here, a TTI having a time duration of 1 ms like an existing subframe (for example, a TTI in LTE Rel. 8 to 12) may be referred to as a "normal TTI (nTTI)." A TTI that is shorter than an nTTI may be referred to as a "shortened TTI (sTTI)."

When sTTIs are used, the time margin for processing in UE and/or eNB (for example, encoding, decoding, etc.) grows, so that the processing latency can be reduced. Also, when sTTIs are used, it is possible to increase the number of UEs that can be accommodated per unit time (for example, 1 ms).

A UE in which sTTIs are configured would use channels of shorter time units than existing data and control channels. For example, a shortened downlink control channel (sPDCCH (shortened PDCCH)), a shortened downlink data channel (sPDSCH (shortened PDSCH)), a shortened uplink control channel (sPUCCH (shortened PUCCH)), a shortened uplink data channel (sPUSCH (shortened PUSCH)), and so forth are under study, as shortened channels to be transmitted and/or received in sTTIs. The above-noted times of (1) and/or (2) may be shortened even when sTTIs are configured in UE.

Now, in existing LTE, UE transmits a PHR, which contains PH information per serving cell, to an eNB, as feedback. This PHR is transmitted via MAC signaling, by using the PUSCH. To be more specific, a PHR is constituted by PHR MAC CEs (Control Elements) contained in the MAC PDU (Protocol Data Unit). The eNB can control the UE's uplink transmission power, dynamically, based on PHRs.

Currently, two types of PHs (type 1 PH and type 2 PH) are defined. Type 1 PH is a PH that takes only the power of the PUSCH into account, and Type 2 PH is a PH that takes both the power of the PUSCH and the power of the PUCCH into account. Note that the PH information may be a value (or the level) of PH, or may be an index that is associated with a value of PH.

The eNB may transmit PHR configuration information, which relates to the conditions for transmitting PHRs, to the UE. This information may be reported, for example, via RRC signaling. The UE judges the timing to transmit a PHR based on the PHR configuration information reported. That is, a PHR is triggered when the PHR transmission conditions are met.

Here, for example, two timers (a periodic PHR timer and a prohibit PHR timer) and a path loss change threshold (dl-PathlossChange) can be used as the PHR configuration information. For example, when the first timer (prohibit PHR timer) expires and the path loss value on the downlink has changed from the value upon the previous PHR transmission by more than the path loss change threshold (dl-PathlossChange), a PHR is triggered. Also, when the second timer (periodic PHR timer) expires, a PHR is triggered. Other conditions for triggering a PHR can be set forth as well, but will not be described herein.

PHRs in existing LTE are calculated in subframe units. Consequently, existing PHR calculation methods cannot take sTTI transmission into consideration in a relevant way.

That is to say, how to calculate PHRs when UE makes transmissions using the sPUSCH and/or the sPUCCH needs to be discussed.

Now, with reference to FIG. 1, problems with introducing sTTIs will be described in detail. FIG. 1 are diagrams to explain problems that might arise when an existing method of PHR calculation is applied to sTTIs. FIG. 1A is a diagram to show an example of calculating a PHR for an nTTI, and FIG. 1B is a diagram to explain the problem with calculating a PHR for a sTTI.

In conventional LTE, a user terminal calculates transmission power per subframe and per channel, gives this transmission power to the channels in each subframe, and transmits the channels. In other words, transmission power is controlled so that average transmission power is maintained (does not change) in the middle of a subframe. Therefore, as shown in FIG. 1A, the UE can calculate the PHR for a given subframe in a unique manner. Note that, to say that average transmission power is maintained, this means that, although instantaneous transmission power might show fluctuations on a time scale that is substantially short compared to a subframe (for example, sample values in a time-domain waveform, the average transmission power on a substantially longer time scale stays constant.

In FIG. 1B, seven sTTIs are included in one subframe (that is, sTTI length=two symbols). In each sTTI, signals may be transmitted using the sPUSCH and/or the sPUCCH, and transmission power may fluctuate per sTTI. No PHR has been designed to cope such a case.

As mentioned earlier, in the event an existing PHR reporting method is applied where shortened processing time and/or shortened TTIs are used, an eNB may not be able to know UE's uplink transmission power accurately.

So, the present inventors have found out a PHR calculation/reporting method that is compatible with cases where shortened processing time and/or shortened TTIs are used.

Now, embodiments of the present invention will be described in detail below with reference to the accompanying drawings. The radio communication methods according to the herein-contained embodiments may be applied alone or may be applied in combination. Note that, although examples will be described below in which an sTTI is two symbols long and one subframe contains seven sTTIs, these examples are by no means limiting. For example, an sTTI may have other symbol lengths, and/or the length of sTTIs in one subframe may show multiple patterns. Also, one subframe may contain any number of sTTIs.

(Radio Communication Method)

First Embodiment

The first embodiment of the present invention relates to which period UE calculates the PHR for when sTTIs are configured in the uplink.

Embodiment 1.1

According to embodiment 1.1, UE calculates the PHR of a specific scheduled sTTI in a subframe where PHR reporting is requested. Embodiment 1.1 is an example to assume that at least one PHR is triggered per subframe, as in existing LTE. In other words, a reporting occasion (reporting period) spans one subframe (is expressed in units of subframe). The reporting period may be referred to as "reporting target period."

Here, a specific scheduled sTTI may be, for example, at least one of following (1) to (6):

(1) the scheduled sTTI with the maximum (or the minimum) transmission power in a subframe;
(2) the first (earliest) scheduled sTTI in a subframe;
(3) the last (final) scheduled sTTI in a subframe;
(4) a scheduled sTTI that is selected arbitrarily by UE in a subframe;
(5) the "average" scheduled sTTI in a subframe, where this "average" scheduled sTTI refers to a virtual sTTI having transmission power (or PH) that is averaged over all scheduled sTTIs in the subframe; and
(6) the "overall average" scheduled sTTI in a subframe, where this "overall average" scheduled sTTI refers to a virtual sTTI having transmission power that is given by averaging the total transmission power of all scheduled sTTIs in the subframe over all sTTIs in the subframe.

FIG. 2 is a diagram to show examples of PHRs according to embodiment 1.1. FIG. 2 illustrates the same situation as in FIG. 1B. When the sTTI of above (1) is employed, the UE reports the PHR in sTTI #1 (PHR of specific scheduled sTTI 1), which has the maximum transmission power, for this subframe. In this case, the base station can identify the case where the PHR is the smallest among the scheduled sTTIs contained in this subframe, which makes it easier to control the transmission power of the user terminal appropriately afterward.

When the sTTI of above (2) is employed, the UE reports the PHR of sTTI #0 (PHR of specific scheduled sTTI 2), which is the first scheduled sTTI, for this subframe. In this case, the user terminal can report the PHR without judging whether or not a second and subsequent scheduled sTTIs are included in the subframe, so that the processing load on the terminal can be reduced.

When the sTTI of above (3) is employed, the UE reports the PHR in sTTI #5 (PHR of specific scheduled sTTI 3), which is the last scheduled sTTI, for this subframe. In this case, the base station can learn the PHR of the latest timing in time, which makes it easier to control the transmission power appropriately.

Note that, when the sTTI of above (5) is employed, the UE reports, for this subframe, a PHR that is based on the "average" scheduled sTTI transmission power, which is given by dividing the total transmission power of sTTIs #0, #1, #4 and #5, which are scheduled sTTIs, by the number of scheduled sTTIs (=4). By this means, the UE can report the average PH for scheduled sTTIs.

Note that, when the sTTI of above (6) is employed, the UE reports, for this subframe, a PHR that is based on the "overall average" scheduled sTTI transmission power, which is given by dividing the total transmission power of sTTIs #0, #1, #4 and #5, which are scheduled sTTIs, by the number of sTTIs (=7). By this means, the UE can report the average PH per sTTI included in a subframe (nTTI).

According to embodiment 1.1, PHs that take sTTIs into account can be reported as PHRs per subframe.

Embodiment 1.2

According to embodiment 1.2 of the present invention, the UE calculates the PHR of every scheduled sTTI where PHR reporting is requested. Embodiment 1.2 is an example to assume that a PHR is triggered more than once per subframe (or sTTI), unlike in existing LTE. In other words, the reporting period is based on sTTIs. In extreme cases, PHRs may be reported for every sTTI. PHRs pertaining to sTTIs may be calculated separately, in units of sTTIs.

Figure 3:
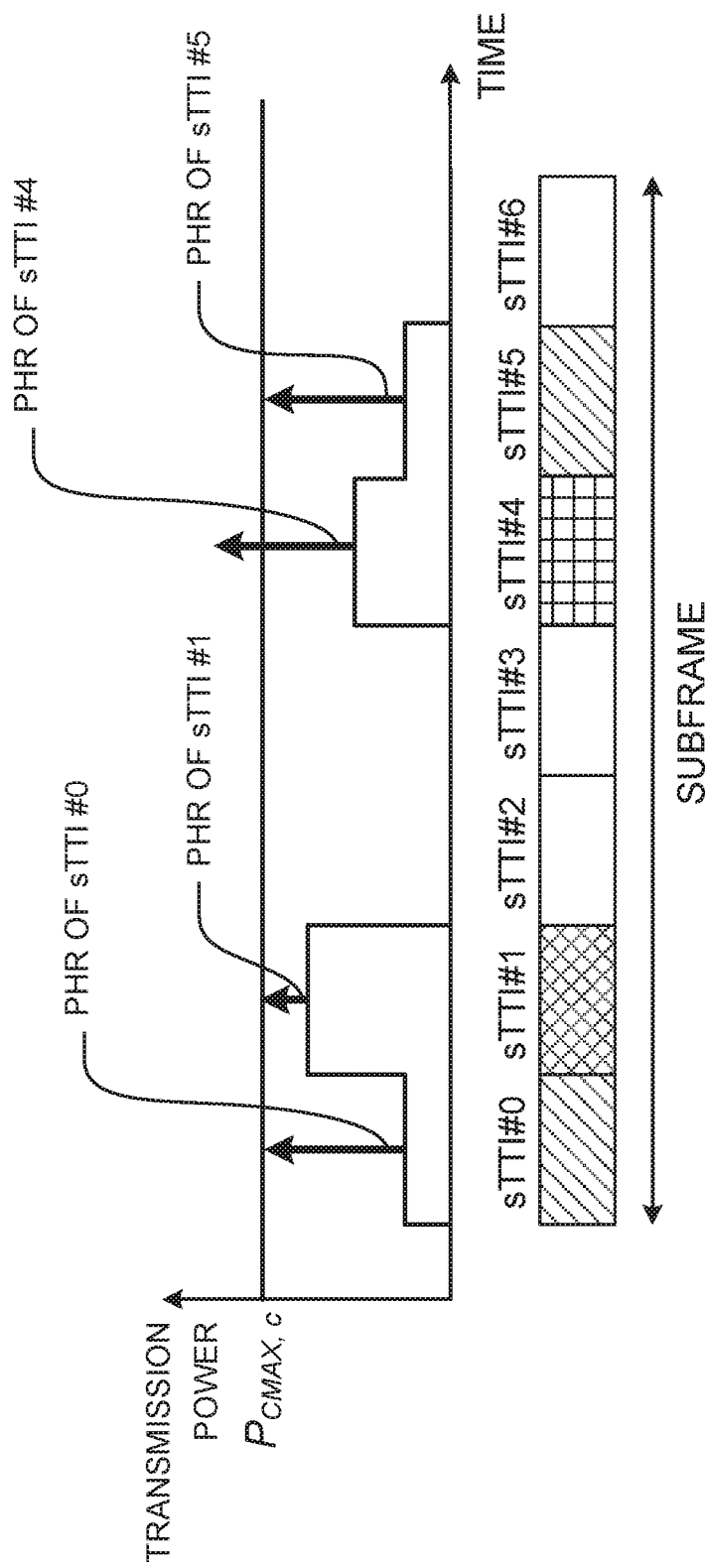
FIG. 3 is a diagram to show examples of PHRs according to embodiment 1.2 of the present invention.

FIG. 3 is a diagram to show examples of PHRs according to embodiment 1.2. FIG. 3 illustrates the same situation as in FIG. 1B. Referring to FIG. 3, when PHR reporting is requested for predetermined scheduled sTTIs (for example, sTTIs #0, #1, #4 and #5), the UE calculates PHRs based on each scheduled sTTI's transmission power.

According to embodiment 1.2, each sTTI's PH can be reported as PHRs per subframe or sTTI.

Embodiment 1.3

The UE may be configured to calculate PHRs without using sTTIs (embodiments 1.3 and 1.4). According to embodiment 1.3, if PHR reporting is requested for a predetermined subframe or sTTI, the UE calculates and reports the PHR of the latest nTTI (1 ms). According to embodiment 1.3, it is possible to prevent the eNB and the UE from misidentifying PHRs.

Embodiment 1.4

If PHR reporting is requested for an sTTI of a predetermined subframe, the UE may calculate and report a virtual PHR. A virtual PHR is equivalent to a PHR not dependent on the bandwidth of the PUSCH. For example, a virtual PHR may be a PHR that is calculated on assumption that no PUSCH/PUCCH is transmitted in a predetermined serving cell, or may be a PHR that is calculated on assumption that the bandwidth of the PUSCH is one resource block. According to embodiment 1.4, it is possible to prevent the eNB and the UE from misidentifying PHRs.

According to the first embodiment described above, it is possible to properly transmit PHRs that reflect the actual status of transmission, as feedback, even when shortened processing time and/or shortened TTIs are used.

Note that, although embodiment 1.1 has been described above assuming that at least one PHR is triggered per subframe, this is by no means limiting. For example, the PHRs of one or more specific scheduled sTTIs may be calculated and reported. Also, although embodiment 1.2 has been described above assuming that that the PHRs of all scheduled sTTIs are to be reported, this is by no means limiting.

The UE may report the PHs of a plurality of sTTIs in one PHR, or distribute these PHs over different PHRs and report them.

Also, a PHR may contain information (for example, a sTTI index) for identifying which sTTI is the subject of reporting. In addition, a PHR may contain information to indicate based on which one of (1) to (6) according to embodiment 1.1 the scheduled sTTI a predetermined PH relates to is specified. Furthermore, in this case, the sTTI (or nTTI) for calculating a PHR and the sTTI (or nTTI) for reporting the PHR may be configured at different timings. If the above information is included in (or accompanies) a PHR, the timing for calculating the PHR and the timing for reporting the PHR can be separated. In this case, control for calculating the PHR first and then reporting the PHR later becomes possible, so that it is possible to reduce the load of the calculation process and the demand on the processing speed in the terminal.

Second Embodiment

A second embodiment of the present invention relates to the timing UL sTTI-configured UE reports PHRs. UE may transmit a PHR in a sPUSCH that is scheduled after a predetermined trigger event has occurred (embodiment 2.1). According to embodiment 2.1, if there is a PUSCH that has been scheduled following the occurrence of a predetermined trigger event, the UE may or may not transmit a PHR in this PUSCH.

Alternatively, the UE may transmit a PHR only in a PUSCH that is scheduled after a predetermined trigger event has occurred (embodiment 2.2). According to embodiment 2.2, even if there is a sPUSCH that has been scheduled following the occurrence of a predetermined trigger event, no PHR is transmitted in this sPUSCH.

Here, the above predetermined trigger events may be, for example, at least one of following (1) to (7);

(1) when the prohibit PHR timer expires or has expired, the path loss in at least one activated serving cell of an arbitrary MAC entity, where path loss is examined, has fluctuated by more than dl-PathlossChange since the last PHR transmission in this MAC entity, and this MAC entity reserves UL resource for new transmission;

(2) when the periodic PHR timer expires;

(3) when the PHR function is configured or reconfigured by higher layer (except for the configuration that disables the PHR function);

(4) when a SCell (secondary cell) of an arbitrary MAC entity where the uplink is configured is activated;

(5) when a PSCell (primary secondary cell) is added;

(6) when the prohibit PHR timer expires or has expired, UL resource for new transmission is reserved for a predetermined MAC entity, and in an activated serving cell of an arbitrary MAC entity where the uplink is configured, a ITT meets the following conditions of (6-1), (6-2) or (6-3):

(6-1) UL resource is allocated for transmission;

(6-2) PUCCH is transmitted in the cell; and (6-3) since the last time this MAC entity had UL resource for transmission or a PHR was transmitted in this cell using a PUCCH, the required power backoff for power management in this cell has fluctuated by more than dl-PathlossChange; and (7) PHR reporting is requested (triggered) by a physical layer signal (for example, DCI) or a MAC layer signal (for example, MAC CE) from the base station.

Note that, the phrase "more than" in the above description of triggers may be read as "equal to or more than."

According to the second embodiment described above, it is possible to properly transmit PHRs that reflect the actual status of transmission, as feedback, even when shortened processing time and/or shortened TTIs are used. According to embodiment 2.1, a PHR is reported if there is a sPUSCH following the occurrence of a PHR trigger, so that it is possible to control transmission power properly based on the latest information. According to embodiment 2.2, a PHR is not reported until there is a PUSCH following the occurrence of a PHR trigger, so that it is possible to reduce the overhead of the sPUSCH.

Third Embodiment

A third embodiment of the present invention relates to the calculation of PHRs in the event a plurality of CCs for the UL, each having a different TTI length (or sTTI length), are configured (for example, when uplink carrier aggregation (UL-CA) is configured).

When a PHR is transmitted in a sPUSCH (or in a PUSCH/sPUSCH of a shorter TTI), UE may calculate this PHR by taking into account PUSCHs (or PUSCHs/sPUSCHs of longer TTIs) that overlap in the same time period (embodiment 3.1). PHs are calculated based on each cell's maximum transmission power ($P_{CMAX,c}$). Meanwhile, the maximum transmission power of a predetermined cell influences the transmission power of other cells. Consequently, according to embodiment 3.1, it is possible to report a PHR that adequately reflects the fluctuation of maximum transmission power per cell.

On the other hand, when a PHR is transmitted in a PUSCH (or in a PUSCH/sPUSCH of a longer TTI), the UE may calculate this PHR without considering (that is, by ignoring) part or all of the sPUSCHs (or PUSCH/sPUSCH of shorter TTIs) that overlap in the same time period (embodiment 3.2). During the process of generating (for example, encoding) a PUSCH in subframe n, which is scheduled by the UL grant of subframe n-k (where k is a number that is equal to or larger than 1), the UE assumes (predicts) that part or all of the sPUSCHs of sTTIs #m in subframe n, scheduled by the UL grant of subframe n-k' (k' is a number greater than or equal to 1), are not present. According to embodiment 3.2, it is possible to reduce the increase of processing load on the UE.

Figure 4:
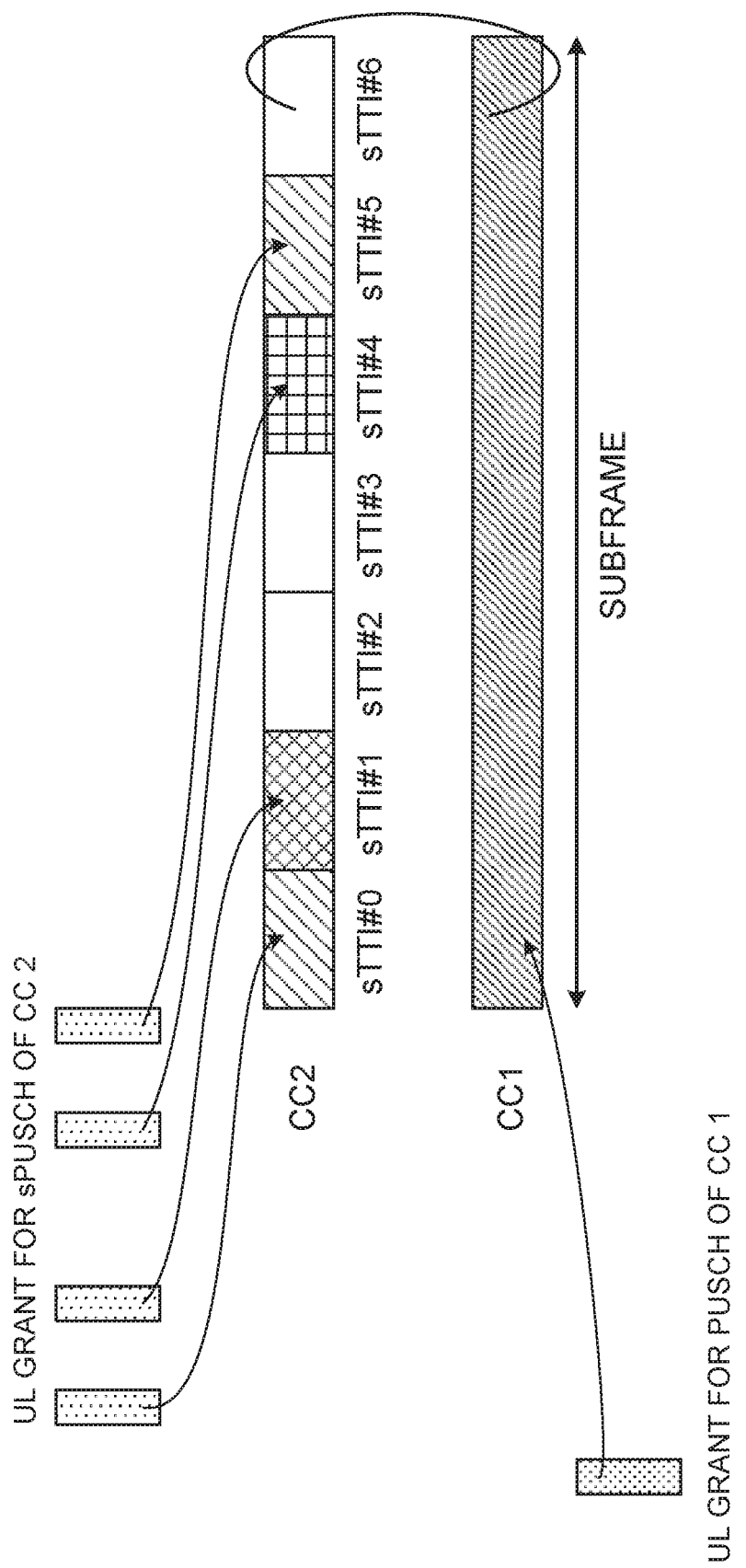
FIG. 4 is a diagram to show examples of PHR calculation according to a third embodiment of the present invention.

FIG. 4 is a diagram to show an example of PHR calculation according to the third embodiment. With reference to FIG. 4, the UE is configured with UL-CA using CC 1 and CC 2. The UE is scheduled to transmit the PUSCH in CC 1 in one subframe, and transmit the sPUSCH in CC 2 in multiple sTTIs (sTTIs #0, #1, #4 and #5) in the same subframe.

When PHRs are calculated according to embodiment 3.1, the UE calculates, for example, the PHRs of sTTI #0, #1, #4 and/or #5 of CC 2, by taking into account the PUSCH of CC 1 in a subframe to overlap these sTTIs.

When PHRs are calculated according to embodiment 3.2, the UE calculates, for example, the PHR of the subframe of CC 1, without considering sPUSCHs of sTTIs of CC2 overlapping this subframe. As shown in FIG. 4, if a PUSCH and a sPUSCH are scheduled in multiple CCs in the same period, the UE expects that the UE will receive a UL grant for a PUSCH first and then a UL grant for a sPUSCH.

Given that the UE starts generating a PUSCH, calculating its transmission power and so forth upon receiving a UL grant for a PUSCH, while this PUSCH's transmission power is calculated, receiving a UL grant for a sPUSCH and taking into account the transmission power of this sPUSCH, overlapping with the PUSCH, will place a significant burden on the UE. According to embodiment 3.2 such a burden can be reduced.

According to the third embodiment described above, it is possible to transmit suitable PHRs as feedback even when multiple UL CCs of different TTI lengths and/or sTTI lengths are configured.

(Variations)

By combining the above described embodiments, various cases can be supported. For example, when UE communicates using one CC configured with sTTIs and PHRs are triggered at most once per subframe, embodiment 1.1, 1.3 or 1.4 and embodiment 2.1 may be combined to support this case.

Also, if the UE communicates using one CC configured with sTTIs and more than one PHR is triggered per subframe (for example, triggered per sTTI), embodiment 1.2 and embodiment 2.1 may be combined to support this case.

Note that, if the processing time configured in UE is short compared to LTE systems and the UE communicates using one CC configured with existing TTIs, the PHR mechanism for existing LTE may be used.

Also, when processing time that is short compared to LTE systems is configured or not configured in UE, multiple CCs for the UL having different TTI lengths and/or sTTI lengths are configured (for example, when UL-CA is configured), and PHRs are triggered at most once per subframe, embodiment 1.1, 1.3 or 1.4, embodiment 2.1 and embodiment 3.1 may be combined to support this case. Also in this case, embodiments 1.3 or 1.4, embodiment 2.2 and embodiment 3.2 may be combined.

Also, when processing time that is short compared to LTE systems is configured or not configured in UE, multiple CCs for the UL having different TTI lengths and/or sTTI lengths are configured (for example, when UL-CA is configured), and PHRs are triggered more than once per subframe (for example, triggered every sTTI), embodiment 1.2, embodiment 2.1 and embodiment 3.1 may be combined.

Note that the patterns for combining these embodiments are not limited to the examples described herein. In addition, information about PHR calculation, information about the timing for transmitting PHRs and so forth may be configured in (reported to) UE.

Here, the information related to the calculation of PHRs may be, for example, information to specify one of the PHR calculation methods described with the first embodiment, the third embodiment and/or others. In addition, the information related to the timing for transmitting PHRs may be information as to whether or not PHRs can be transmitted (will be transmitted) in the sPUSCH, whether or not PHRs can be transmitted (will be transmitted) in the PUSCH, for example, as has been described above with the second embodiment.

At least one of the information related to the calculation of PHRs, the information related to the timing for transmitting PHRs and so forth may be reported to UE by using higher layer signaling (for example, RRC signaling, broadcast information, etc.), MAC signaling, physical layer signaling (for example, DCI) and other signals, or by combining these.

Note that, for each embodiment, nTTIs and subframes can be generalized and read as "long TTIs," and sTTI as "short TTIs." Also, the TTI length of a long TTI is not limited to 1 ms, and the TTI length of a short TTI has only to be shorter than the TTI length of a long TTI, and needs not be shorter than 1 ms.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 5:
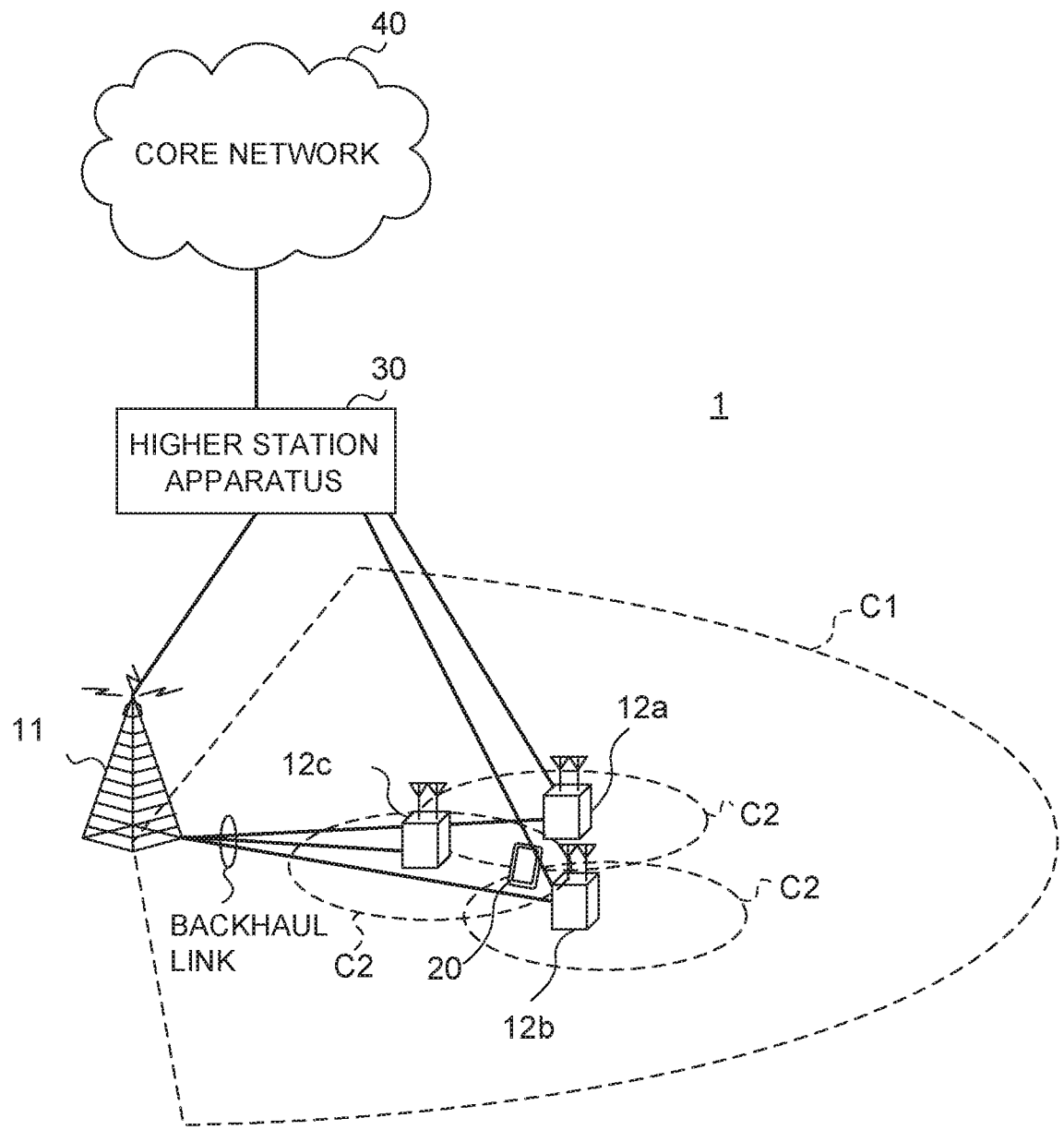
FIG. 5 is a diagram to show an example of a schematic structure of a radio communication system according to one embodiment of the present invention.

FIG. 5 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSS), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 6:
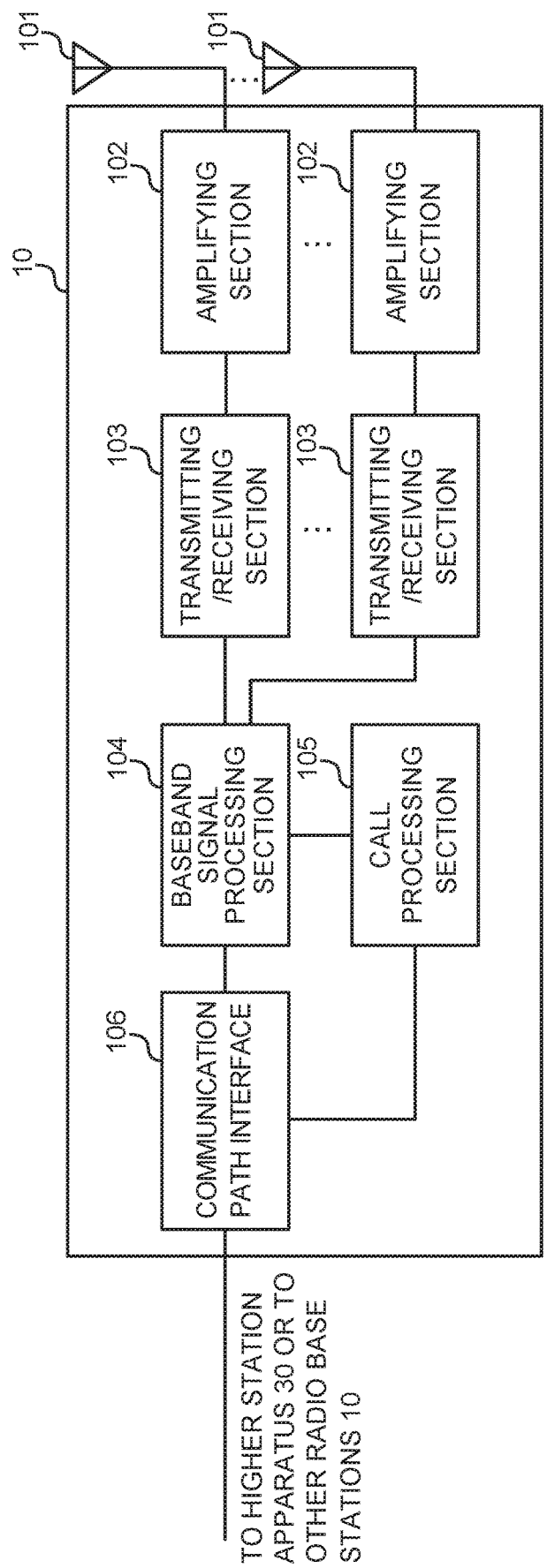
FIG. 6 is a diagram to show an example of an overall structure of a radio base station according to one embodiment of the present invention.

FIG. 6 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive uplink signals transmitted in shortened transmission time intervals (sTTIs) in predetermined carriers (cells, CCs, etc.). For example, the transmitting/receiving sections 103 receive, from the user terminal 20, uplink signals that are transmitted using sPUCCH and/or sPUSCH. Also, the transmitting/receiving sections 103 receive power headroom reports (PHRs), which are each based on one or more sTTIs' power headroom (PH). The transmitting/receiving sections 103 may transmit at least one of information about the calculation of PHRs and information about the timing for transmitting PHRs, to the user terminals 20.

Figure 7:
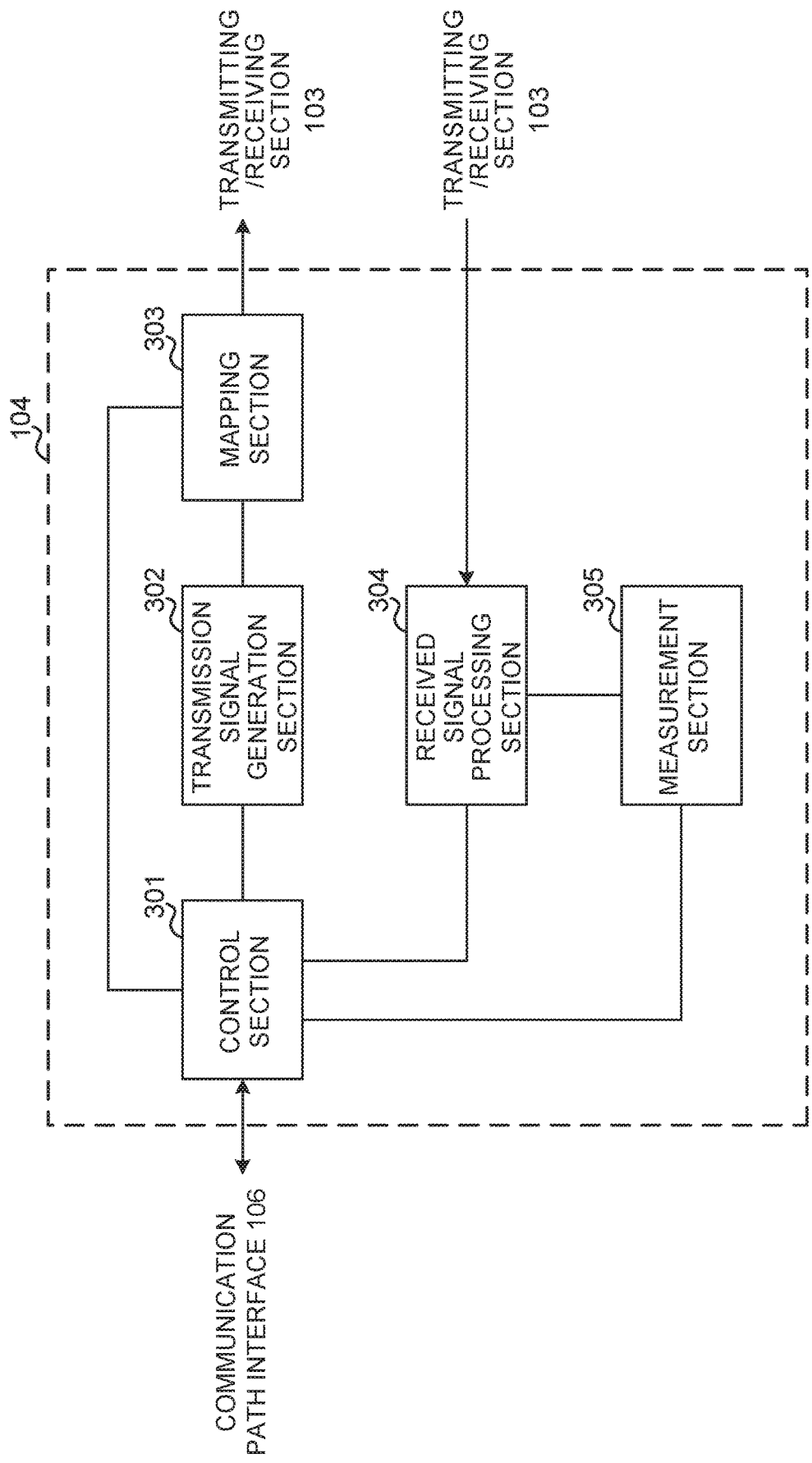
FIG. 7 is a diagram to show an example of a functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 controls the receipt of PHRs, which are generated and transmitted based on one or more sTTIs (PH of sTTIs). The control section 301 may transmit a trigger for a PHR for a predetermined subframe and/or sTTI, to a user terminal 20.

For example, when transmitting a trigger for one PHR per subframe (nTTI), to a predetermined user terminal 20, the control section 301 may exert control so that PHRs that are generated based on the PHs of specific scheduled sTTIs are received.

Also, when transmitting triggers for multiple PHRs per subframe to a predetermined user terminal 20, the control section 301 may exert control so that PHRs that are generated based on the PHs of sTTIs, in which PHRs are triggered and which are scheduled, are received.

The control section 301 may exert control so that a PHR is received in a shortened uplink data channel (for example, a scheduled sPUSCH) that is scheduled after a predetermined trigger event has occurred in a user terminal 20, as described above with the second embodiment.

Even when there is a shortened uplink data channel that has been scheduled following the occurrence of a predetermined trigger event in the user terminal 20, the control section 301 may control a PHR to be received in a scheduled uplink data channel (for example, a scheduled PUSCH).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality), the SINR (Signal to Interference plus Noise Ratio), uplink channel information (for example, CSI) and so on of the received signals. The measurement results may be output to the control section 301.

(User Terminal)

Figure 8:
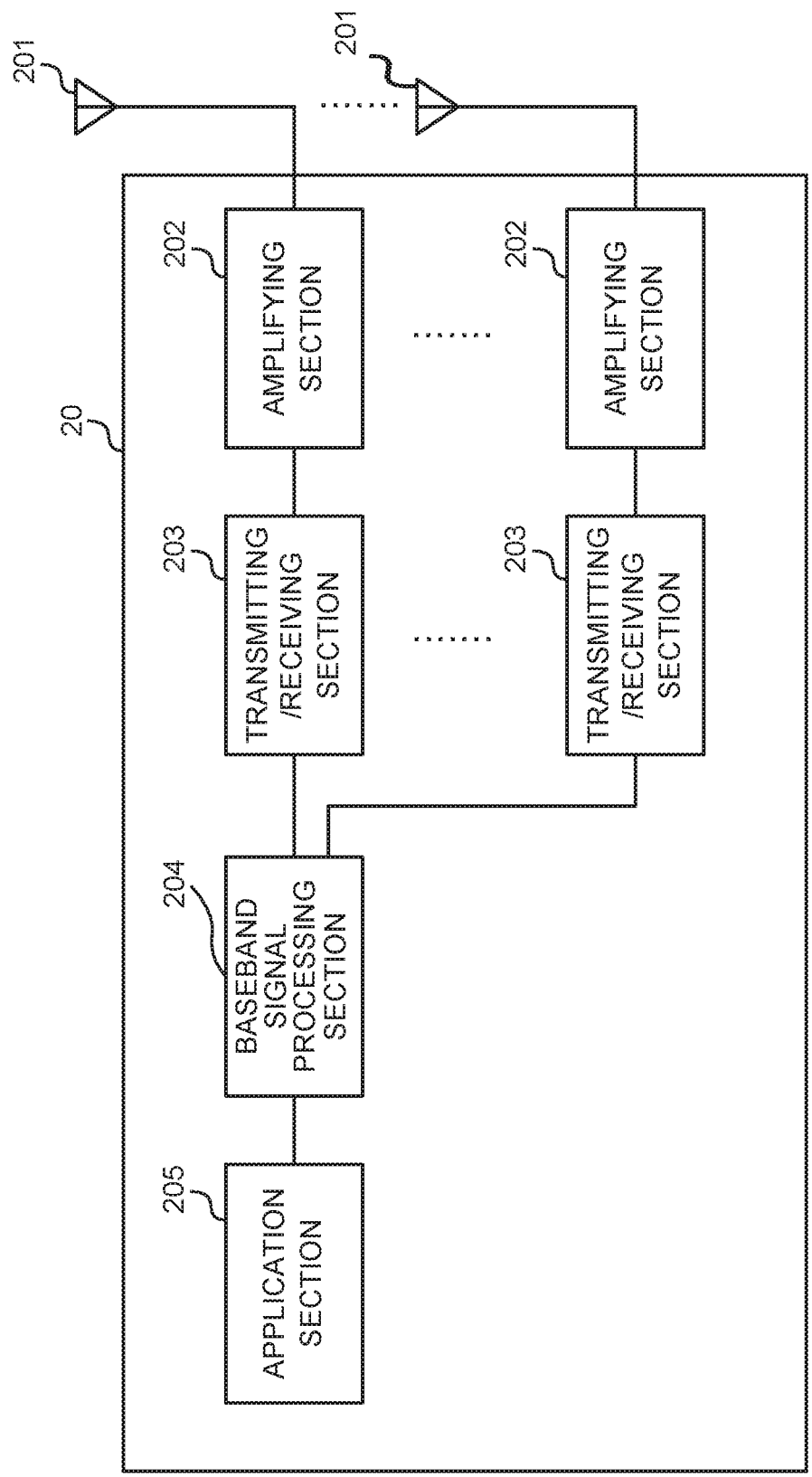
FIG. 8 is a diagram to show an example of an overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit uplink signals in shortened transmission time intervals (sTTIs) in given carriers (cells, CCs, etc.). For example, the transmitting/receiving sections 203 transmit uplink signals to the radio base station 10 by using sPUCCH and/or sPUSCH. In addition, the transmitting/receiving sections 203 transmit power headroom reports (PHRs), which are each based on one or more sTTIs' power headroom (PH). The transmitting/receiving sections 203 may receive at least one of information about the calculation of PHRs and information about the timing for transmitting PHRs, from the radio base station 10.

Figure 9:
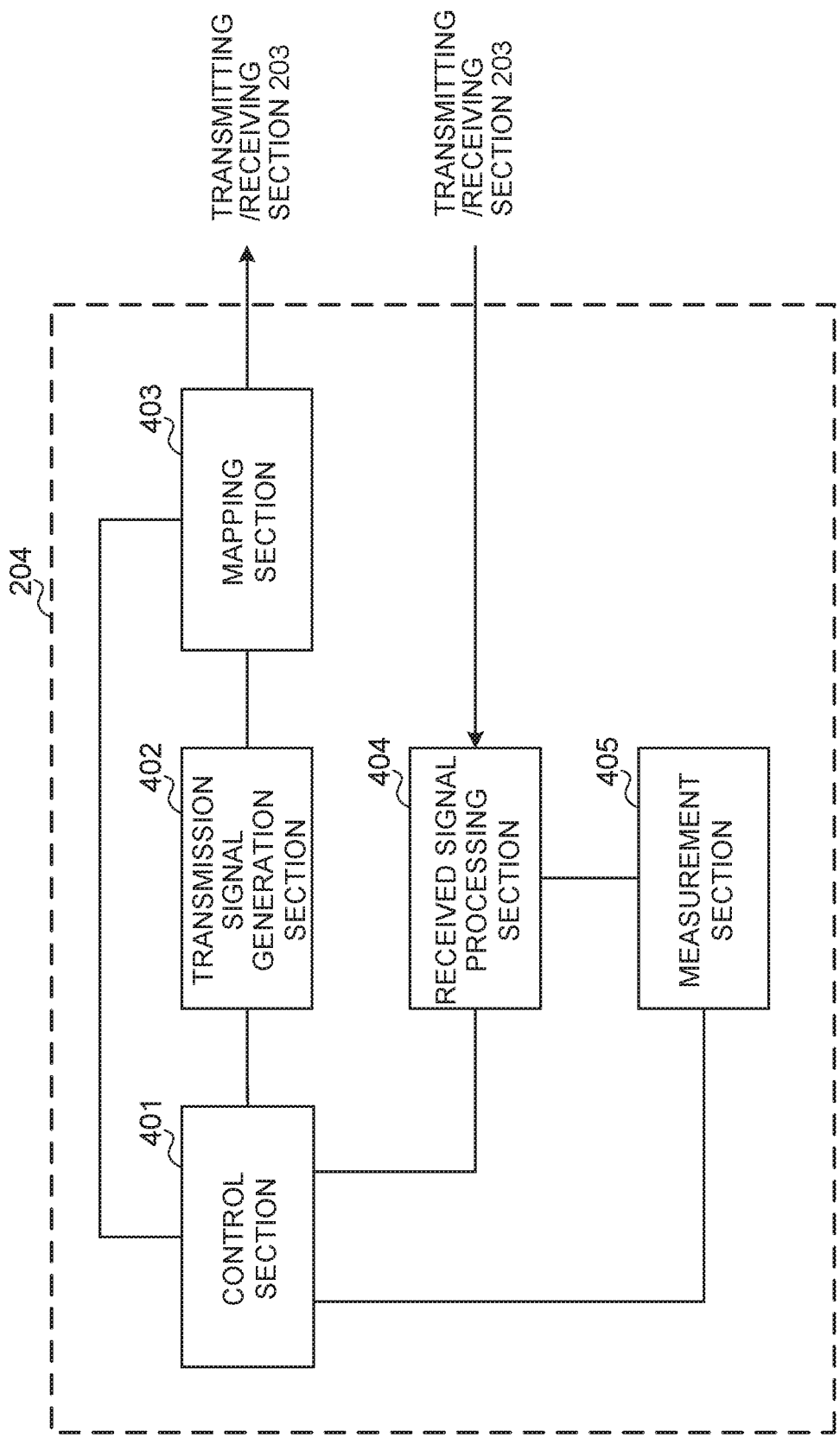
FIG. 9 is a diagram to show an example of a functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires downlink control signals (for example, signals transmitted in the PDCCH/EPDCCH) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls the generation and transmission of PHRs based on one or more sTTIs (PHs of sTTIs). For example, when one PHR is triggered per subframe, the control section 401 may exert control so that PHRs are generated based on the PHs of specific scheduled sTTIs.

Also, when multiple PHRs are triggered per subframe, the control section 401 may exert control so that PHRs are generated based on the PHs of sTTIs in which PHRs are triggered, and which are scheduled.

The control section 401 may exert control so that the PHR is transmitted in a shortened uplink data channel (for example, a scheduled sPUSCH) that is scheduled after a predetermined trigger event has occurred, as described above with the second embodiment.

Even when there is a shortened uplink data channel that has been scheduled following the occurrence of a predetermined trigger event, the control section 401 may control a PHR to be transmitted in a scheduled uplink data channel (for example, a scheduled PUSCH).

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal to generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 can measure the path loss of each CC on the downlink. The measurement section 405 may, for example, have two PHR timers (a periodic PHR timer and a prohibit PHR timer), and information related to the PHR timer, path loss and so forth may be configured from the control section 401. The measurement section 405 may inform the control section 401 to trigger predetermined PHRs based on the PHR timer, path loss and so forth.

The measurement section 405 may measure, for example, the received power (for example, RSRP), the received quality (for example, RSRQ, received SINR), downlink channel information (for example, CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 10:
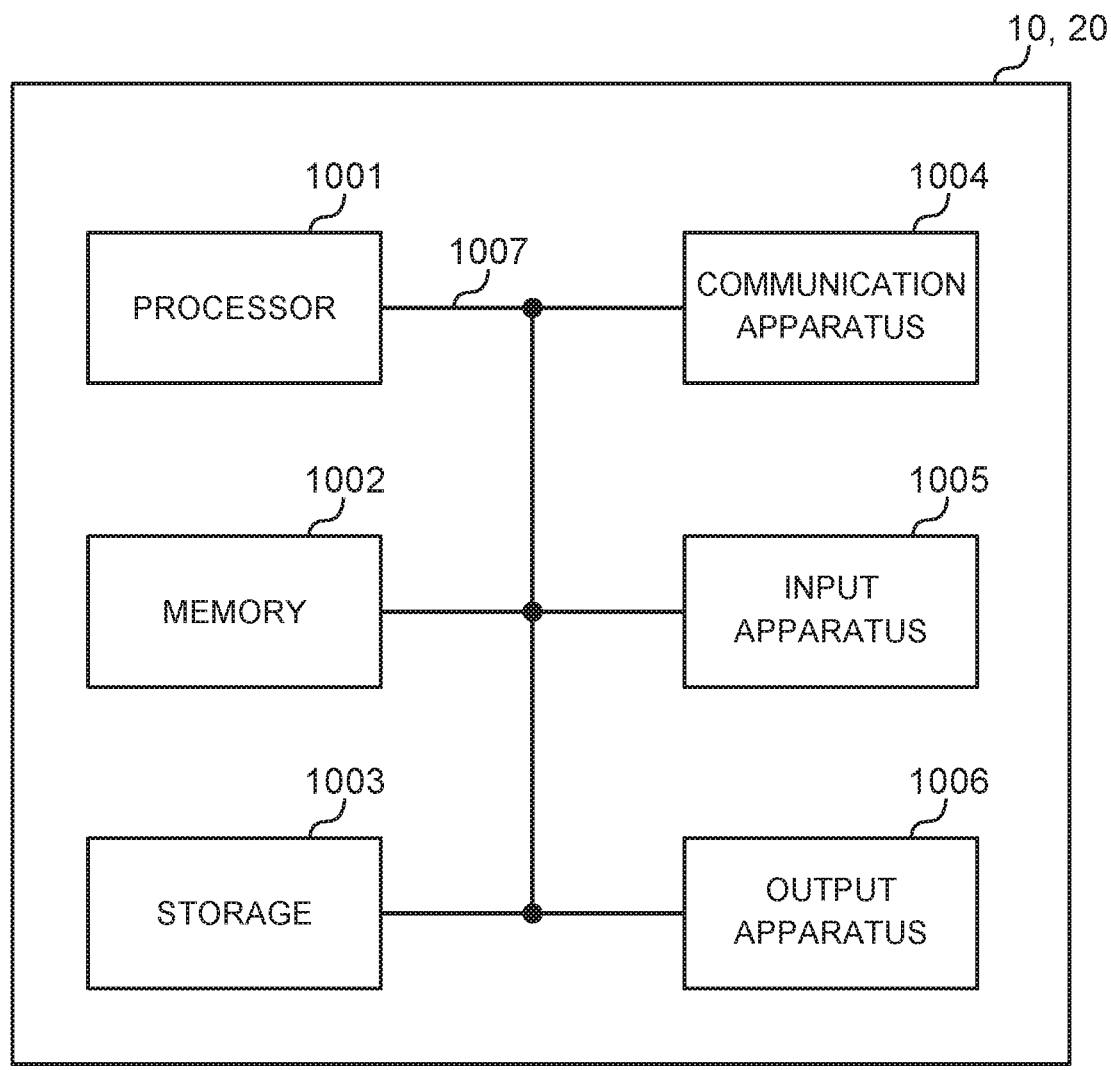
FIG. 10 is a diagram to show an example hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," or one slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "mini-slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may serve as the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations pertaining to the number of subframes included in a radio frame, the number of slots included in a subframe, the number of symbols and RBs included in a slot, the number of subcarriers included in an RB, the number of symbols in a TTI, the duration of symbols, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-179896, filed on Sep. 14, 2016, including the specification, drawings and abstract, is incorporated herein by reference in its entirety.

The invention claimed is:

1. A terminal comprising:
  a receiver that receives a first downlink control information (DCI) scheduling a first Physical Uplink Shared Channel (PUSCH) of a first cell;
  a processor that performs, in a case where the receiver further receives, after the first DCI, a second DCI scheduling a second PUSCH of a second cell and wherein the second PUSCH overlaps the first PUSCH, a control in which the second PUSCH is not considered in a calculation of a power headroom report (PHR) in the first PUSCH; and
  a transmitter that transmits the PHR in the first PUSCH,
  wherein a transmission duration of the first PUSCH is longer than a transmission duration of the second PUSCH.

2. The terminal according to claim 1, wherein the transmission duration of the first PUSCH and the transmission duration of the second PUSCH are configured by separate uplink grants.

3. A radio communication method for a terminal comprising:
  receiving a first downlink control information (DCI) scheduling a first Physical Uplink Shared Channel (PUSCH) of a first cell;
  performing, in a case where the terminal further receives, after the first DCI, a second DCI scheduling a second PUSCH of a second cell and wherein the second PUSCH overlaps the first PUSCH, a control in which the second PUSCH is not considered in a calculation of a power headroom report (PHR) in the first PUSCH; and
  transmitting the PHR in the first PUSCH,
  wherein a transmission duration of the first PUSCH is longer than a transmission duration of the second PUSCH.

4. A base station comprising:
  a transmitter that transmits a first downlink control information (DCI) scheduling a first Physical Uplink Shared Channel (PUSCH) of a first cell; and
  a receiver that receives, in a case where the transmitter further transmits, after the first DCI, a second DCI scheduling a second PUSCH of a second cell and wherein the second PUSCH overlaps the first PUSCH, a power headroom report (PHR) in the first PUSCH that is calculated by not considering the second PUSCH,
  wherein a transmission duration of the first PUSCH is longer than a transmission duration of the second PUSCH.

5. A system comprising:
  a terminal that comprises:
    a receiver that receives a first downlink control information (DCI) scheduling a first Physical Uplink Shared Channel (PUSCH) of a first cell;
    a processor that performs, in a case where the receiver further receives, after the first DCI, a second DCI scheduling a second PUSCH of a second cell and wherein the second PUSCH overlaps the first PUSCH, a control in which the second PUSCH is not considered in a calculation of a power headroom report (PHR) in the first PUSCH; and
    a transmitter that transmits the PHR in the first PUSCH; and
  a base station that comprises:
    a transmitter that transmits the first DCI; and
    a receiver that receives the PHR in the first PUSCH,
  wherein a transmission duration of the first PUSCH is longer than a transmission duration of the second PUSCH.

* * * * *